(12) United States Patent
Koitabashi

(10) Patent No.: US 7,539,372 B2
(45) Date of Patent: May 26, 2009

(54) CONTACTLESS CONNECTOR

(75) Inventor: Hiroyuki Koitabashi, Komaki (JP)

(73) Assignee: Chubu Nihon Maruko Co., Ltd., Komaki (JP)

( * ) Notice: Subject to any disclaimer, the term of this patent is extended or adjusted under 35 U.S.C. 154(b) by 637 days.

(21) Appl. No.: 11/234,333

(22) Filed: Sep. 23, 2005

(65) Prior Publication Data

US 2006/0072920 A1 Apr. 6, 2006

(30) Foreign Application Priority Data

Oct. 5, 2004 (JP) ............................. 2004-292160

(51) Int. Cl.
*G02B 6/26* (2006.01)
(52) U.S. Cl. .......................................... 385/26; 385/25
(58) Field of Classification Search ............... 385/26
See application file for complete search history.

(56) References Cited

U.S. PATENT DOCUMENTS

| | | | |
|---|---|---|---|
| 4,525,025 A | 6/1985 | Hohmann et al. | |
| 4,555,631 A | 11/1985 | Martens | |
| 5,134,639 A | 7/1992 | Vekstein et al. | |
| 5,354,993 A | 10/1994 | Kedmi et al. | |
| 5,818,188 A | 10/1998 | Hirai et al. | |
| 6,104,849 A * | 8/2000 | Lewis et al. ................. | 385/26 |
| 2004/0062344 A1 | 4/2004 | Popescu et al. | |
| 2004/0141686 A1 | 7/2004 | Schilling et al. | |

FOREIGN PATENT DOCUMENTS

| | | |
|---|---|---|
| EP | 1 187 152 | 3/2002 |
| JP | 57-138231 | 8/1982 |
| JP | 59-178420 | 10/1984 |
| JP | 61-24961 | 6/1986 |
| JP | 4-362605 | 12/1992 |
| JP | 6-261003 | 9/1994 |
| JP | 2002-075760 | 3/2002 |
| JP | 05-134140 | 5/2003 |

* cited by examiner

*Primary Examiner*—Sung H Pak
(74) *Attorney, Agent, or Firm*—Greer, Burns & Crain, Ltd.

(57) ABSTRACT contactless connector that secures communication continuity is provided. The contactless connector comprises a rotation-side light element disposed on a rotating body that rotates about a rotational axis and a fixed-side light element disposed on a fixed body in a position facing the rotation-side light element, and which sends and receives data contactlessly between the rotation-side light element and the fixed-side light element, wherein the rotating body is formed in a cylindrical shape with the rotational axis serving as the center axis of the rotating body; the rotation-side light element is on the cylindrical face of the rotating body and is disposed to emit light in the circumferential direction in which the rotating body rotates; and the fixed-side light element is disposed on the fixed body so as to be able to receive the light that is emitted from the rotation-side light element.

8 Claims, 16 Drawing Sheets

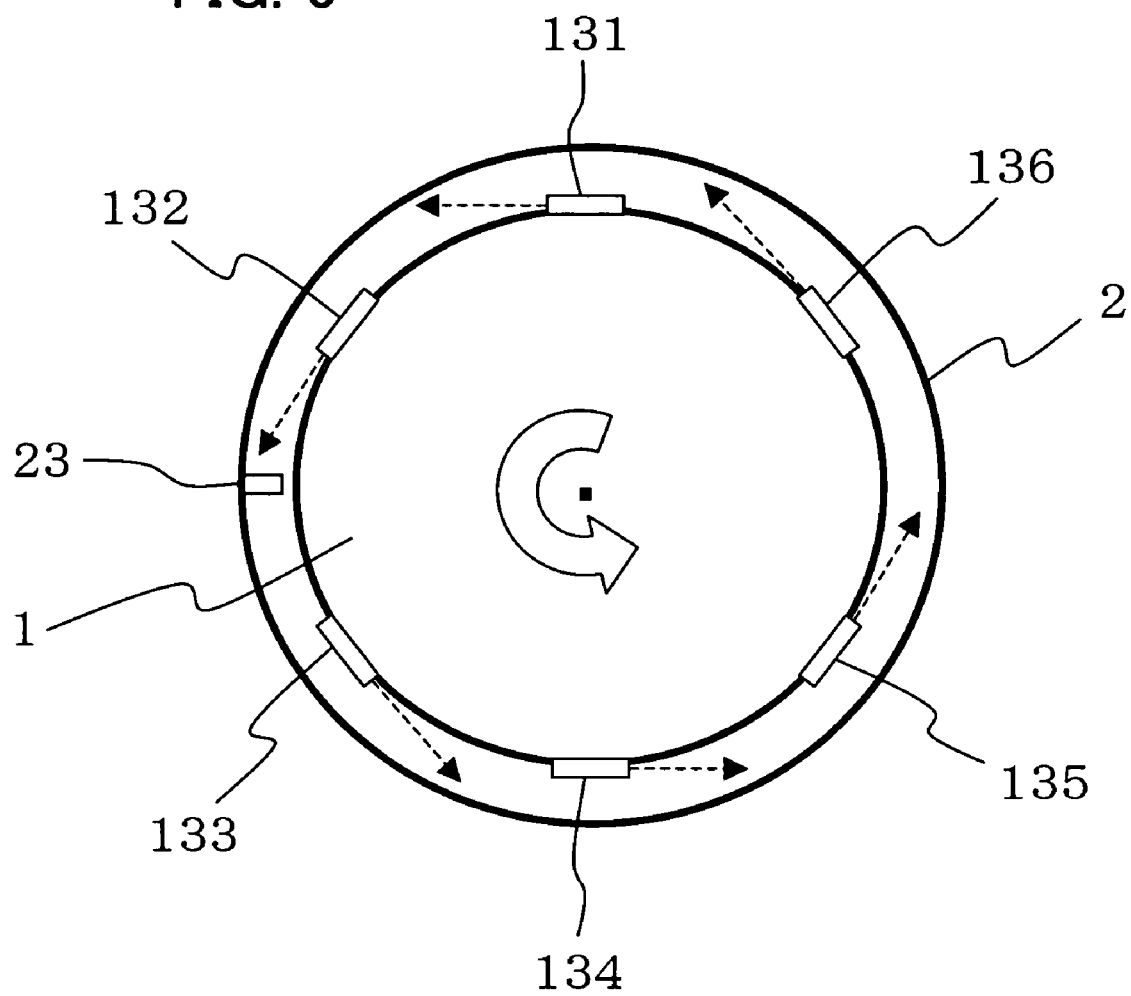

CONTACTLESS CONNECTOR

CROSS-REFERENCE TO RELATED APPLICATIONS

This application is based upon and claims the benefit of priority from the prior Japanese Patent Application No. 2004-292160, filed on Oct. 5, 2004, the entire contents of which are incorporated herein by reference.

BACKGROUND OF THE INVENTION

1. Field of the Invention

The present invention relates to a contactless connector which contactlessly sends and receives data and, in particular, to a contactless connector which constitutes a light path in a circumferential direction in which a rotating body rotates.

2. Description of the Related Art

In the prior art, data has been sent and received between a rotating side and fixed side. For example, a video signal or the like from a rotatable camera is transmitted to a fixed-side signal processing portion, and so forth. In this case, by directly connecting the camera and the signal processing portion by wire, the video signal from the camera have been transmitted to the fixed side signal processing portion. However, with the advances of wireless signal technology in recent years, it has become possible to perform data transmission and reception between the rotating side and the fixed side, even without a direct wire connection.

However, there has been the problem that it is difficult to supply contactlessly power from the fixed side to the rotating side, if the data is transmitted wirelessly from the rotating side to the fixed side.

Therefore, conventionally, a plurality of light-emitting elements have been provided on the top of a disk-shaped rotating body and a plurality of light-receiving elements of a fixed body have been provided in positions facing the light-emitting elements, data has been transmitted and received contactlessly, and a rotating transformer is constituted between the rotating side and fixed side, whereby the contacless supply of power from the fixed side to the rotating side has been (see Japanese Patent Application Laid Open No. 2002-75760, for example).

However, in Japanese Patent Application Laid Open No. 2002-75760, as the data communication speed is increased it may not necessarily be possible to transmit all the data from the light-emitting element of the rotating body to the light-receiving element of the fixed body. That is, in Japanese Patent Application Laid Open No. 2002-75760, the light path from light-emitting elements is switched to other light-receiving elements because the contactless light connection between the light elements is broken due to the rotation of the rotating body. In this switching method, as the data communication speed is increased there are cases in which data is transmitted faster than the time for processing to switch the light pass, so that the continuity of communication cannot be secured.

SUMMARY OF THE INVENTION

Therefore, the present invention was conceived in view of the above problem, and an object thereof is to provide a contactless connector for securing the continuity of communication.

In order to achieve the above object, the present invention is a contactless connector including a rotation-side light element provided on a rotating body that rotates about a rotational axis, and a fixed-side light element provided on a fixed body in a position facing the rotation-side light element, and performing contactless data transmission and reception between the rotation-side light element and the fixed-side light element, wherein the rotating body is formed in a cylindrical shape with the rotational axis as the center axis of the rotating body; the rotation-side light element is on the cylindrical face of the rotating body and is provided to emit light in the circumferential direction in which the rotating body rotates; and the fixed-side light element is provided on the fixed body so as to be able to receive the light that is emitted from the rotation-side light element. As a result, light that is emitted in a circumferential direction, for example, is able to constitute a light path that is unbroken despite the rotation of the rotating body, whereby communication continuity can be secured.

Further, a contactless connector of this invention is characterized in that the rotation-side light element is provided extending over a plurality of stages on the cylindrical face of the rotating body, and the fixed-side light element is provided extending over a plurality of stages on the fixed body. As a result, because data can be transmitted and received between a plurality of light-emitting elements, for example, a contactless connector that implements multiple channels can be provided.

Furthermore, a contactless connector of this invention is characterized in that the rotation-side light element and the fixed-side light element are provided on a region between the rotating body and the fixed body and on a plurality of concentric circles in which the rotating body rotates, and provided extending over a plurality of stages. As a result, because rotation-side light-emitting elements and fixed-side light-emitting elements are arranged extending over a plurality of concentric circumferences, for example, multiple channels can be implemented.

Further, a contactless connector of this invention is characterized in that rotation-side light-receiving elements and rotation-side light-emitting elements are provided in combination on the cylindrical face of the rotating body, and fixed-side light-emitting elements and fixed-side light-receiving elements are each provided in combination in position which an unbroken light path to the rotation-side light-receiving elements and rotation-side light-emitting elements is formed respectively with the rotation of the rotating body. As a result, because it is possible to send and receive data from the fixed body to the rotating body as well as from the rotating body to the fixed body, for example, data transmission and reception through bidirectional communication can be performed.

Further, a contactless connector of this invention is characterized in that rotation-side light-emitting elements or rotation-side light-receiving elements are provided in any stage of the rotating body; fixed-side light-receiving elements or fixed-side light-emitting elements are each provided in positions which an unbroken light path to the rotation-side light-emitting elements or the rotation-side light-receiving elements is formed respectively with the rotating of the rotating body; rotation-side light-receiving elements or rotation-side light-emitting elements are provided in a different stage from the any stage; and fixed-side light-emitting elements or fixed-side light-receiving elements are each provided in positions which an broken light path to the rotation-side light-receiving elements or the rotation-side light-emitting elements is formed respectively with the rotating of the rotating body. As a result, because data can be sent and received from the rotating body to the fixed body at a certain stage and data can be sent and received from the fixed body to the rotating body at another stage, for example, data can be sent and received bidirectionally between the rotating body and fixed body.

Further, a contactless connector of this invention is characterized in that a switching unit, to which data output from a rotation-side light-receiving element or a fixed-side light-receiving element is input, and which are for identifying which light-emitting element input data is from and for switching the identified input data to an output that is requested beforehand. As a result, input data can be outputted to an optional output stage, for example.

Further, a contactless connector of this invention is characterized in that a rotating transformer that is comprised by a transformer core and a transformer winding on the rotating body and the fixed body respectively. As a result, power can be supplied contactlessly from the fixed body to the rotating body, for example.

Further, a contactless connector of this invention is characterized in that the rotating body and the fixed body both further comprise a groove or a cutout, and the rotation-side light element and the fixed-side light element are provided in the groove or the cutout. As a result, for example, communication continuity can be secured and, because light-emitting elements are provided in the rotating body and fixed body, miniaturization of the contactless connector is possible.

Further, a contactless connector of this invention is characterized in that the fixed body further comprises a mirror for reflecting light emitted from the rotation-side light element or the fixed-side light element. As a result, the light that is emitted from the rotation-side light elements and the fixed-side light elements is reflected by the fixed body, therfore a light path that is unbroken even if the rotating body is rotating can be comprised.

The contactless connector of the present invention is able to provide a contactless connector that secures communication continuity by constituting a light path that is unbroken in the circumferential direction in which the rotating body rotates between the rotation-side light-emitting elements and fixed-side light-emitting elements.

BRIEF DESCRIPTION OF THE DRAWINGS

FIG. 5 serves to illustrate a light path that is constituted by the rotation-side light element 13 and fixed-side light element 23;

DESCRIPTION OF THE PREFERRED EMBODIMENTS

Preferred embodiments of the present invention will be described hereinbelow with reference to the drawings.

Figure 1:
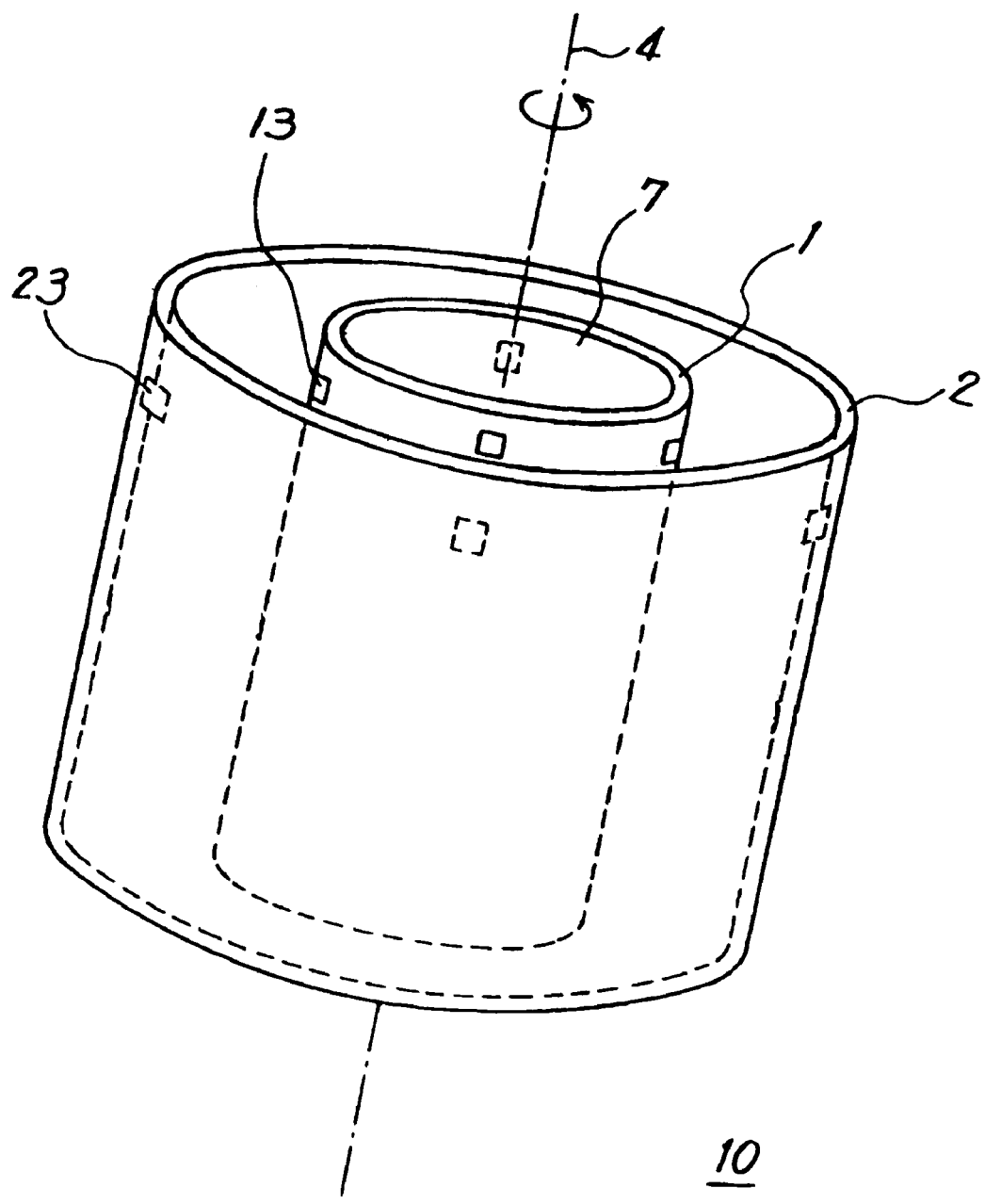
FIG. 1 is a perspective view of a contactless connector 10 to which the present invention is applied.

FIG. 1 is an external perspective view of the contactless connector 10 with a cylindrical form. The contactless connector 10 in FIG. 1 comprises a rotating body 1 and a fixed body 2.

The rotating body 1 is connected to a main body apparatus and rotates about a rotational axis 4 by means of rotational drive from the main body apparatus. The rotating body 1 comprises a hollow portion 7 at the center of which is the rotational axis 4. The contactless connector 10 allows the rotating body 1 to be mounted on the rotational shaft of the main body apparatus via the hollow portion 7. Further, the fixed body 2 is formed in a cylindrical shape with the rotational axis 4 at the center thereof and is provided so as to surround the circumference of the rotating body 1.

In addition, a plurality of light elements 13, 23 are arranged in a plurality of stages on the cylindrical outside wall of the rotating body 1 and the cylindrical inside wall of the fixed body 2. Data from the main body apparatus is transmitted from the rotation-side light elements 13 of the rotating body 1 and is received contactlessly by the fixed-side light elements 23 of the fixed body 2. The received data is outputted to the main body apparatus connected to the fixed body 2, for example. Here, the rotation-side light elements 13 are provided to emit light in the circumferential direction in which the rotating body 1 rotates. The fixed-side light elements 23 are also provided on the fixed body 2 to allow light from the circumferential direction to be received. The details are given afterwards.

Figure 2:
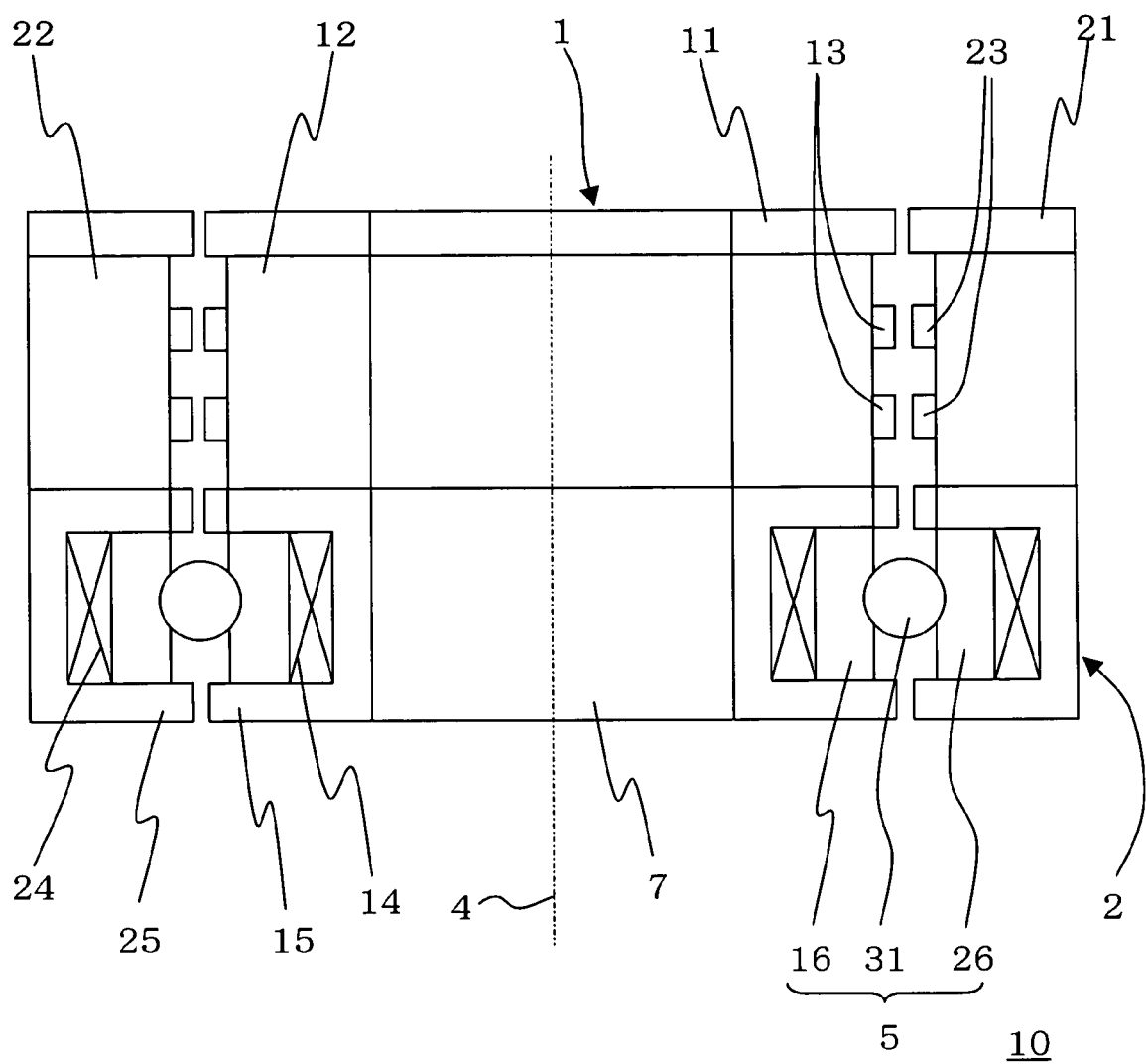
FIG. 2 is a cross-sectional view of a contactless connector 10 to which the present invention is applied.

The contactless connector 10 will be described in detail next with reference to FIG. 2. FIG. 2 is a cross-sectional view in a plane containing the rotational axis 4 of the contactless connector 10.

The rotating body 1 comprises a rotation-side electric circuit portion 11, a rotation-side holding portion 12, the rotation-side light elements 13, rotation-side transformer winding 14, a rotation-side transformer core 15, an inner ring 16 of a bearing 5, and the hollow portion 7.

The rotation-side electric circuit portion 11 is provided on the upper portion of the rotating body 1, and performs various data processing. For example, when the rotating portion of a turntable on which a camera for image pickup is mounted is attached to the rotating body 1, a video signal or similar from the camera is inputted to the rotation-side electric circuit portion 11, and an electrical signal is outputted causing the rotation-side light element 12 to emit light.

The rotation-side holding portion 12 is positioned on the lower portion of the rotation-side electric circuit portion 11, and holds the rotation-side electric circuit portion 11.

The rotation-side light elements 13 are on the outer circumference of the rotation-side holding portion 12 and are positioned along the outside wall of the rotating body 1. In FIG. 2, two-stage rotation-side light elements 13 are arranged. The rotation-side light elements 13 are connected to the rotation-side electric circuit portion 11, and transmit data to the fixed-side light elements 23 contactlessly by emitting light on the basis of a drive data from the rotation-side electric circuit portion 11. Further, in this example, one channel's worth of data is transmitted by one rotation-side light element 13.

The rotation-side transformer winding 14 is on the lower portion of the rotation-side holding portion 12, and is positioned in depression on the outside perimeter of the rotating body 1. Power is supplied from the fixed body 2 through electromagnetic inductive action, and power can be supplied to each portion of the rotating body 1 by this rotation-side transformer winding 14.

The rotation-side transformer core 15 is formed so as to enclose the rotation-side transformer winding 14, and has a U-shaped cross-section. The rotation-side transformer core 15 houses the rotation-side transformer winding 14 in the depression thereof, and forms a rotating transformer with the fixed body 2. The contactless supply of power from the fixed body 2 will be described subsequently.

The inner ring 16 of bearing 5 is provided along the outside circumference of the rotating body 1 and in a position in contact with a rolling element 31, and smoothly allows the rotating action of the rotating body 1. The inner ring 16 is formed from a nonmagnetic material such as a resin material.

The hollow portion 7 has a hollow structure with the rotational axis 4 at the center thereof, and is mounted on the rotational shaft of the main body apparatus. As a result, the contactless connector 10 can be mounted on the main body apparatus, and air and oil or the like is able to flow vertically in FIG. 2 from the main body apparatus via the hollow portion 7, for example.

Next, the fixed body 2 is explained. The fixed body 2 comprises a fixed-side electric circuit portion 21, a fixed-side holding portion 22, the fixed-side light elements 23, a fixed-side transformer winding 24, a fixed-side transformer core 25, and an outer ring 26 of the bearing 5.

The fixed-side electric circuit portion 21 is provided in the upper portion of the fixed body 2. The fixed-side electric circuit portion 21 is connected to the fixed-side light elements 23, and processes data that is received contactlessly to and from the rotation-side light elements 13 and outputs the processed data to an external apparatus connected to the fixed body 2.

The fixed-side holding portion 22 is positioned in the lower portion of the fixed-side electric circuit portion 21, and holds the fixed-side electric circuit portion 21.

The fixed-side light elements 23 are located in positions to send and receive light signals to and from the rotation-side light elements 13 and are provided on the inside wall opposite the rotating body 1 of the fixed body 2. The fixed-side optical element 23 receives the light from the rotation-side light elements 13, and contactless data reception is performed between the rotating body 1 and fixed body 2. A total of four of the fixed-side light elements 23 are provided, two each of which are provided on the left and right in FIG. 2 in the same way as the rotation-side light elements 13. Further, the fixed-side light elements 23 are provided on the fixed body 2 in the same quantity or a greater quantity than the rotation-side light elements 13 so as to be able to receive continuously the light from the rotation-side light elements 13.

The fixed-side transformer winding 24 is in a position corresponding to the rotation-side transformer winding 14, and is positioned on the inner periphery side of the fixed body 2. The fixed-side transformer winding 24 supplies power from the external apparatus connected to the fixed body 2.

The fixed-side transformer core 25 is formed so as to enclose the fixed-side transformer winding 24, and has a U-shaped cross-section. The fixed-side transformer core 25 houses the rotating-side transformer winding 24 in the depression thereof, and forms a rotating transformer with the rotating body 1.

The outer ring 26 of bearing 5 is provided along the inside circumference of the fixed body 2 and in a position in contact with the rolling element 31. The outer ring 26 is formed from a nonmagnetic material such as a resin in the same way as the inner ring 16.

Further, the contactless connector 10 comprises the rolling element 31 between the rotating body 1 and the fixed body 2, and the bearing 5 is formed from the rolling element 31, the inner ring 16 of the rotating body 1, and the outer ring 26 of the fixed body 2. The bearing 5 possesses the function of aligning the rotating body 1 and fixed body 2 and of effecting the smooth rotation of the rotating body 1 on the inside circumference of fixed body 2. Further, the bearing 5 is constituted by a nonmagnetic material such as a steel material or resin material.

A light path that is formed by the rotation-side light elements 13 and fixed-side light elements 23 thus constituted will be described next.

Figure 3A:
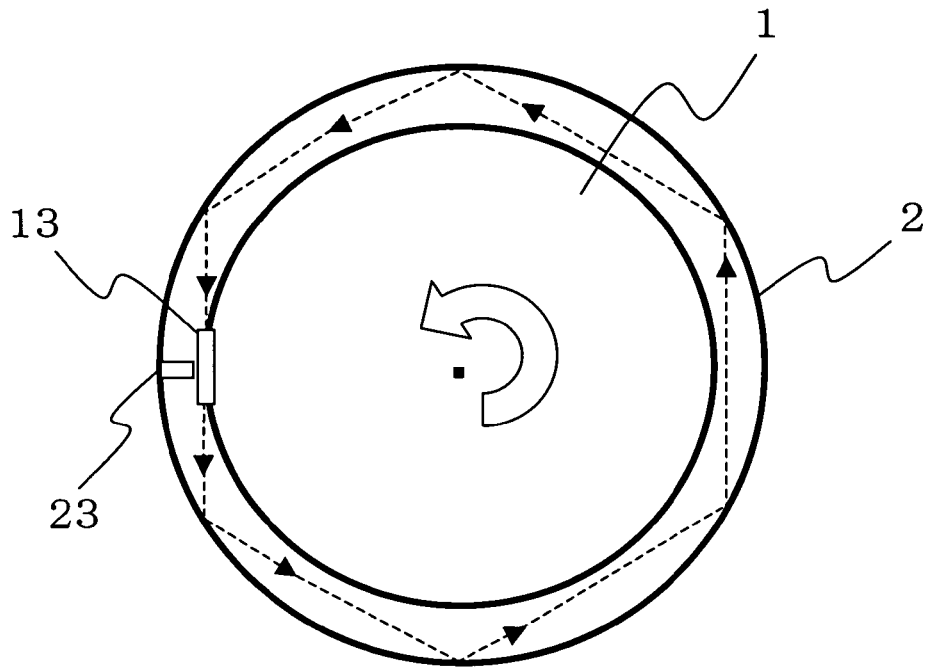
FIGS. 3A-B serve to illustrate a light path that is constituted by a rotation-side light element 13 and fixed-side light element 23.

FIG. 3A serves to illustrate the light path in a position where the rotation-side light elements 13 and fixed-side light elements 23 face one another. In this example, one of each of the rotation-side light elements 13 and the fixed-side light elements 23 are provided on the rotating body 1 and fixed body 2 respectively.

The light that is emitted from the rotation-side light elements 13 is emitted in the circumferential direction in which the rotating body 1 rotates. The emitted light travels toward the inside wall of the fixed body 2. However, a mirror for reflecting light is provided on the inside wall of the fixed body 2, and the light falling incident on the inside wall is reflected by the mirror. Naturally, in the case of a raw material of high reflectance, the raw material may be a raw material other than a mirror. The light that is emitted from the rotation-side light elements 13 is reflected repeatedly by the mirror provided on the inside wall, whereby the light path shown in FIG. 3A is formed before falling incident on the fixed-side light elements 23 as shown in FIG. 3A.

Figure 3B:
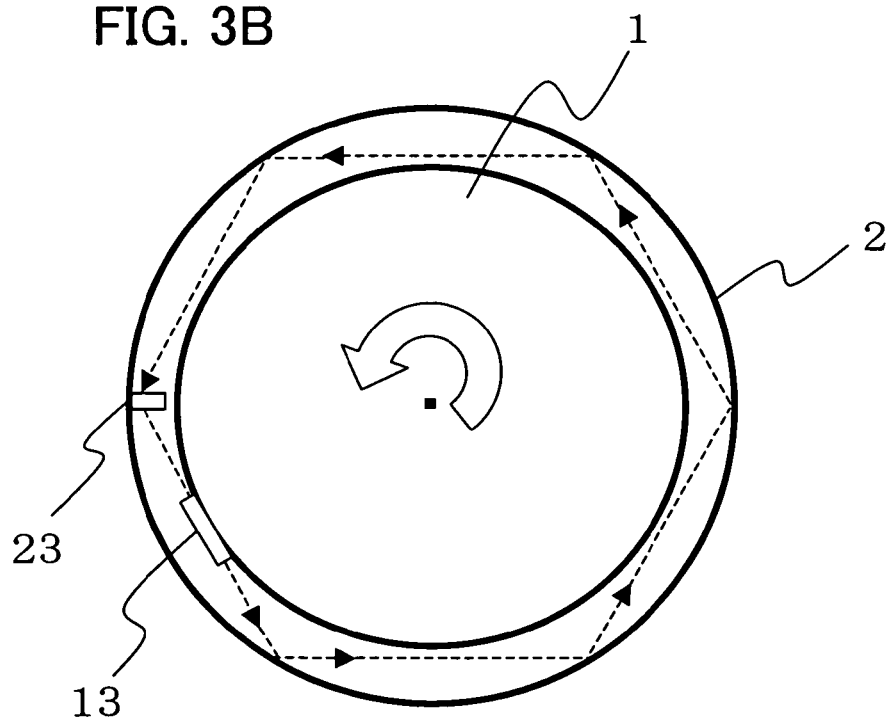

Thereafter, the position of the rotation-side light element 13 moves from the position shown in FIG. 3A to the position shown in FIG. 3B in accordance with the rotation of the rotating body 1. Here also, the light that is emitted by the rotation-side light element 13 is repeatedly reflected by the mirror of the fixed body 2, and falls incident on the fixed-side light element 23 as illustrated.

Thus, when the light path of the light that is emitted from the rotation-side light element 13 is formed as a regular hexagon, the light that is emitted from the rotation-side light element 13 always falls incident on the fixed-side light element 23. Therefore, communication continuity can be secured without the light path between the rotation-side light element 13 and the fixed-side light element 23 being broken despite the rotation of the rotating body 1.

Figure 4A:
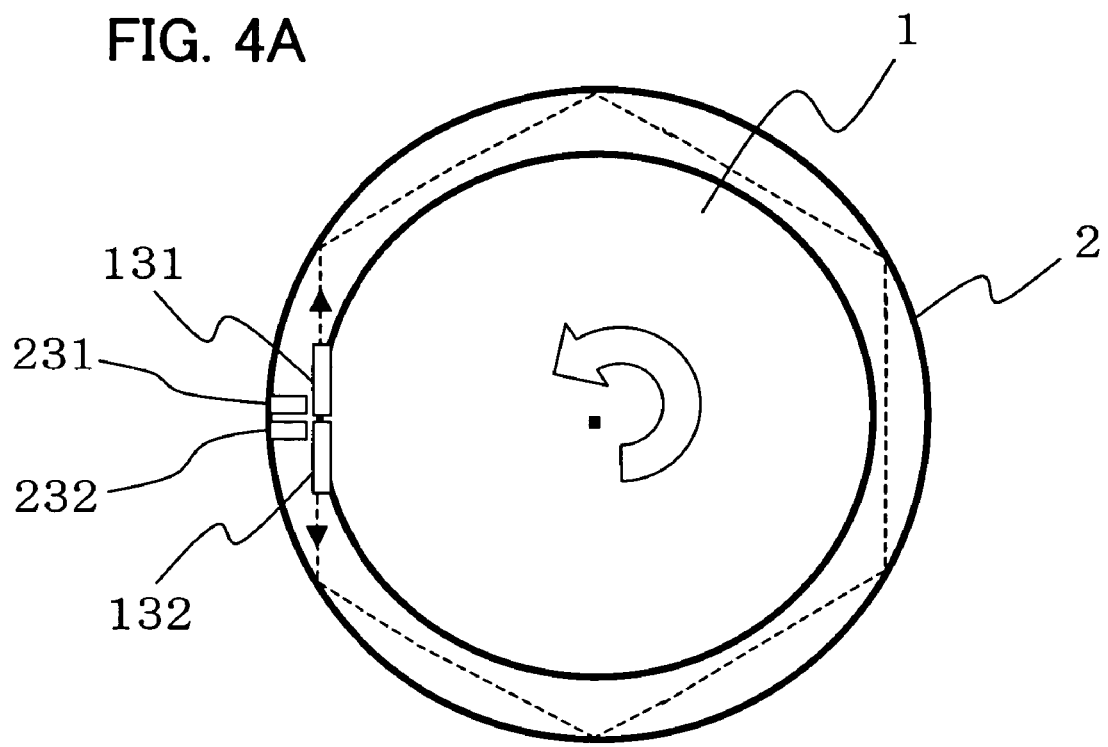
FIGS. 4A-B serve to illustrate a light path that is constituted by the rotation-side light element 13 and fixed-side light element 23.

The light path when two rotation-side light elements 131, 132 and two fixed-side light elements 231, 232 are arranged on the rotating body 1 and the fixed body 2 respectively will be described next with reference to FIG. 4. The two rotation-side light elements 131, 132 both emit light in the circumferential direction in which the rotating body 1 rotates but emit light in opposite directions each other as shown in FIG. 4A. In this case, the inside wall of the fixed body 2 is provided with a mirror and, therefore, the light that is emitted by the rotation-side light elements 131, 132 is reflected by the mirror, and the light path shown in FIG. 4A is formed. That is, the light that is emitted by the rotation-side light element 131 is repeatedly reflected by the mirror provided on the inside wall of the fixed body 2 and falls incident on the fixed-side light element 232, and the light that is emitted by the rotation-side light element 132 is also similarly reflected repeatedly and falls incident on the fixed-side light element 231.

Figure 4B:
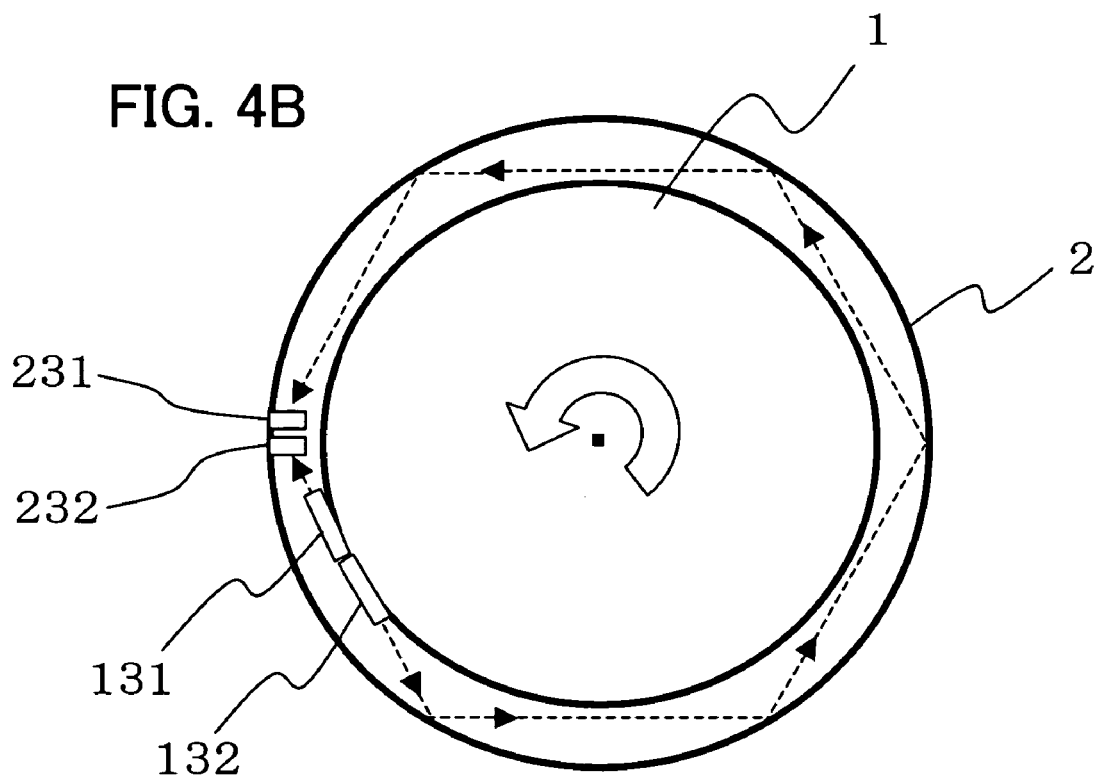

Thereafter, the positions of the rotation-side light elements 131, 132 move to the positions shown in FIG. 4B in accordance with the rotation of the rotating body 1. However, in this case also, the light that is emitted by the rotation-side light element 131 falls directly incident on the fixed-side light element 232, and the light that is emitted by the rotation-side light element 132 is repeatedly reflected and falls incident on the fixed-side light element 231.

The light that is emitted by the rotation-side light elements 131, 132 always falls incident on the fixed-side light elements 231, 232 despite the rotation of the rotating body 1. Therefore, communication continuity can be secured without the light path between the rotation-side light elements 131, 132 and fixed-side light element 231, 232 being broken despite the rotation of the rotating body 1.

FIG. 5 is an example in which six rotation-side light elements 131 to 136 are arranged on the rotating body 1, and one fixed-side light element 23 is arranged on the fixed body 2. For example, when the rotation-side light element 131 is considered, a light path like that in FIG. 3 is formed even when the rotating body 1 is rotating, and the light that is emitted by the rotation-side light element 131 always falls incident on the fixed-side light element 23. The same is true for the rotation-side light element 132. Therefore, the light emitted from the six rotation-side light elements 131 to 136 always falls incident on fixed-side light element 23, and an unbroken light path is formed. Accordingly, communication continuity can be secured. However, in the case of this example, a plurality of light paths from the respective rotation-side light elements 131 to 136 exist in the region between the rotating body 1 and the fixed body 2.

The example of FIGS. 3 to 5 is an example in which the light is emitted from the rotation-side light element 13 and received by the fixed-side light element 23. That is, this is an example in which the rotation-side light element 13 functions as a light-emitting element, and the fixed-side light element 23 functions as a light-receiving element. Otherwise, the fixed-side light element 23 may be the light-emitting element, and the rotation-side light element 13 may be the light-receiving element. In this case, because there is reversibility in the light path shown in FIG. 3 and so forth, the light that is emitted by the fixed-side light element 23 can be received by the rotation-side light element 13 in any position. Therefore, an unbroken light path is formed, and communication continuity can be secured.

Furthermore, the example of FIG. 3 and so forth is an example in which one or a plurality of rotation-side light elements 13 are arranged on the rotating circumference of the rotating body 1. However, rotation-side light elements 13 may be provided in a plurality of stages on the side wall of the outside circumference of the rotating body 1 as shown in FIG. 2. The light path of each stage is exactly the same as the example in FIG. 3 or the like. In this case, communication continuity and multiple channels due to the arrangement of a plurality of light elements 13, 23 can be implemented.

In addition, at a certain stage, the rotation-side light element 13 can be a light-emitting element and the fixed-side light element 23 can be a light-receiving element, and, at another stage, the rotation-side light element 13 can be a light-receiving element and the fixed-side light element 23 can be a light-emitting element. In this case, data can be sent and received from the fixed body 2 to the rotating body 1 as well as from the rotating body 1 to the fixed body 2 and, therefore, bidirectional communication can be implemented along with multiple channels.

In addition, light-emitting elements and light-receiving elements are arranged in combination for the rotation-side light elements 13 at a certain stage, and light-emitting elements and light-receiving elements can also be arranged in combination for the fixed-side light elements 23. As a result, communication can be performed bidirectionally between the rotating body 1 and the fixed body 2. Further, multiple channels can be implemented by providing these rotation-side light elements 13 and fixed-side light elements 23 at a plurality of stages on the rotating body 1 and the fixed body 2.

Figure 6:
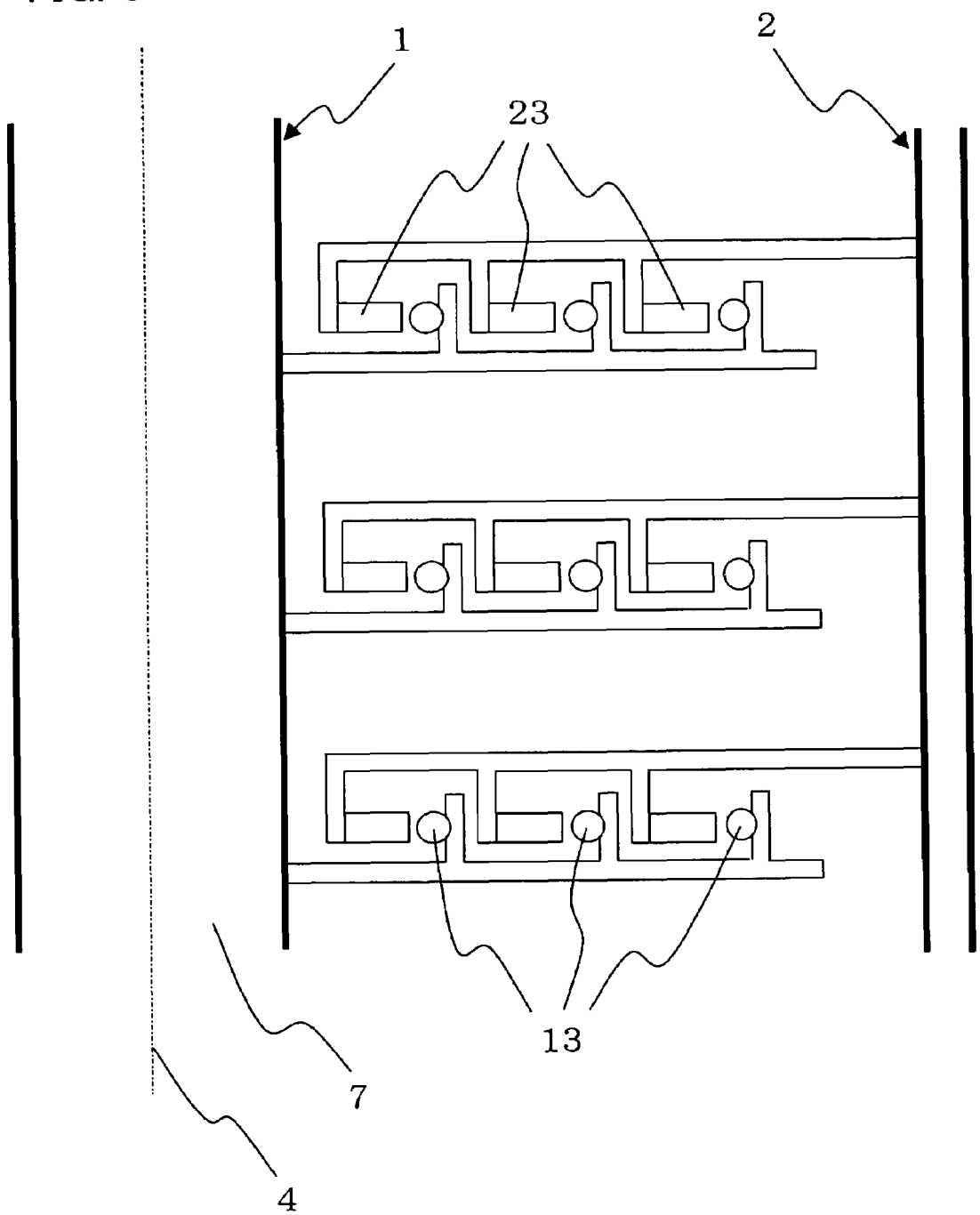
FIG. 6 is a cross-sectional view of contactless connector 10 to which the present invention is applied.

FIG. 6 is a constitutional view of when additional multiple channels of the rotation-side light elements 13 and fixed-side light elements 23 constituted at a plurality of stages can be implemented. FIG. 6 is a cross-sectional view in the plane containing the rotational axis 4 as per FIG. 1.

Pillars for supporting the rotation-side light elements 13 extend from the rotating body 1 over a plurality of stages in the direction of the fixed body 2 in the region between the rotating body 1 and the fixed body 2. Pillars also similarly extend in a plurality of stages from the fixed body 2 toward the rotating body 1. Further, pillars also extend from the respective pillars parallel to the rotational axis 4 to form vertically meshing comb teeth. The rotation-side light elements 13 and the fixed-side light elements 23 are arranged facing one another on these pillars. Hence, the rotation-side light elements 13 and the fixed-side light elements 23 are arranged in pairs in positions of a plurality of concentric circles in the region between the rotating body 1 and the fixed body 2.

In this case also, the unbroken light path illustrated in FIG. 3 and so forth is formed between the rotation-side light elements 13 and the fixed-side light elements 23 located in the same stages. Accordingly, the contactless connector 10 that secures communication continuity and in which additional multiple channels are implemented can be provided.

Figure 7:
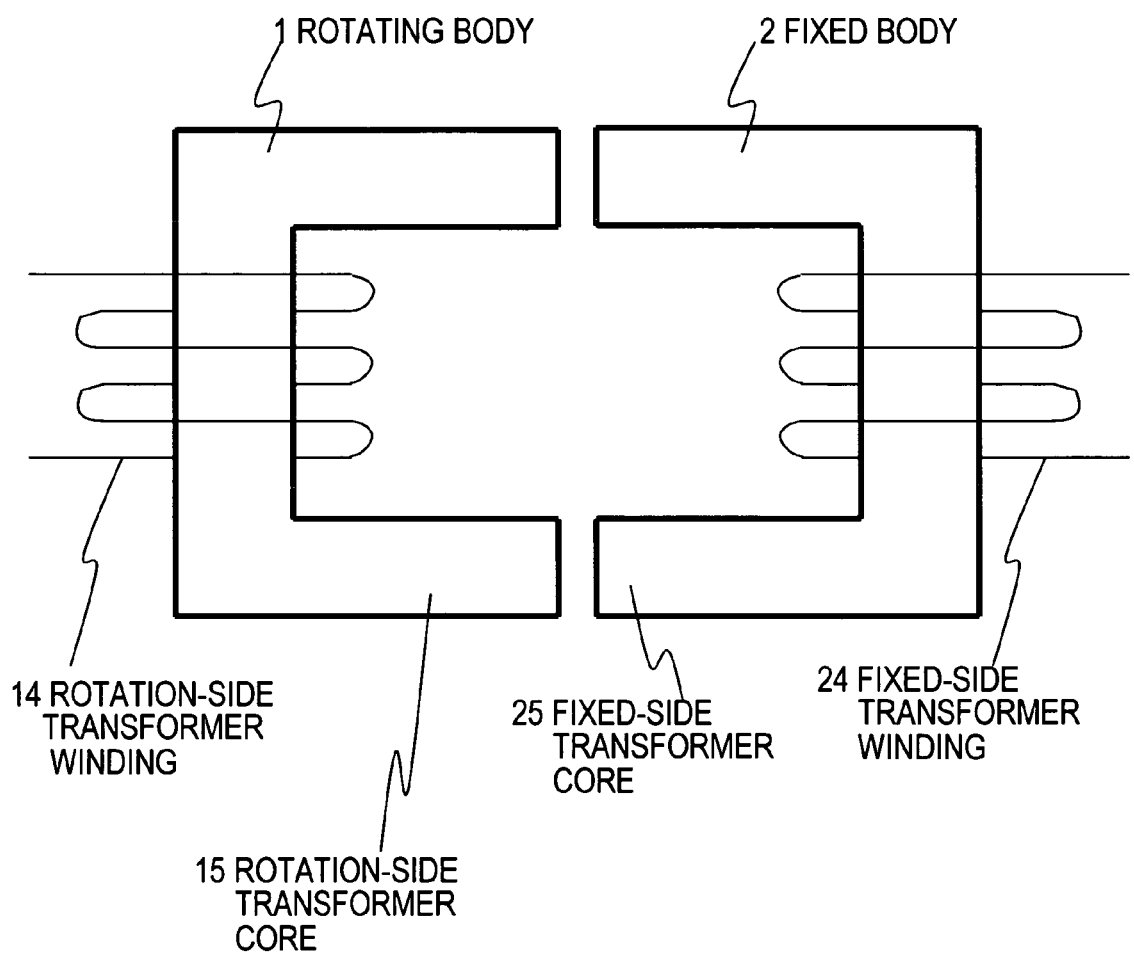
FIG. 7 serves to illustrate contactless supply of power.

A contactless supply of power from the fixed body 2 to the rotating body 1 will now be described by using FIG. 7. As explained above, the rotation-side transformer winding 14 is wound around the trunk part of the rotation-side transformer core 15 of the rotating body 1, and the fixed-side transformer winding 24 is wound around the trunk part of the fixed-side transformer core 25 of the fixed body 2. In this state, a magnetic field is produced in the periphery of the fixed-side transformer core 25 as a result of the supply current flowing from the main body apparatus to the fixed-side transformer winding 24. Through the rotating action of the rotating body 1, a magnetic circuit is formed when the rotating-side transformer core 15 is positioned at the position corresponding to the fixed-side transformer core 25 generating the magnetic field, and a current is generated (by so-called law of electromagnetic induction) in the rotating-side transformer winding 14 wound around the trunk part of the rotating-side transformer core 15. As a result, power is supplied to each part of the rotating body 1, and the rotation-side electrical circuit portion 11 is driven and the rotation-side light elements 13 emit light, for example. Therefore, the contactless supply of power from the fixed body 2 to the rotating body 1 can be performed. Further, the fixed-side electric circuit portion 21 of the fixed body 2 directly supplies the power from the main body apparatus.

Next, another embodiment of the contactless connector 10 according to the present invention will be described with reference to FIGS. 8 to 14. In every embodiment, the rotation-side light elements 13 are provided arbitrarily so that the light path is formed in the circumferential direction in which the rotating body 1 rotates, and the fixed-side light elements 23 are provided so that same are able to receive the light from the rotation-side light elements 13.

Figure 8:
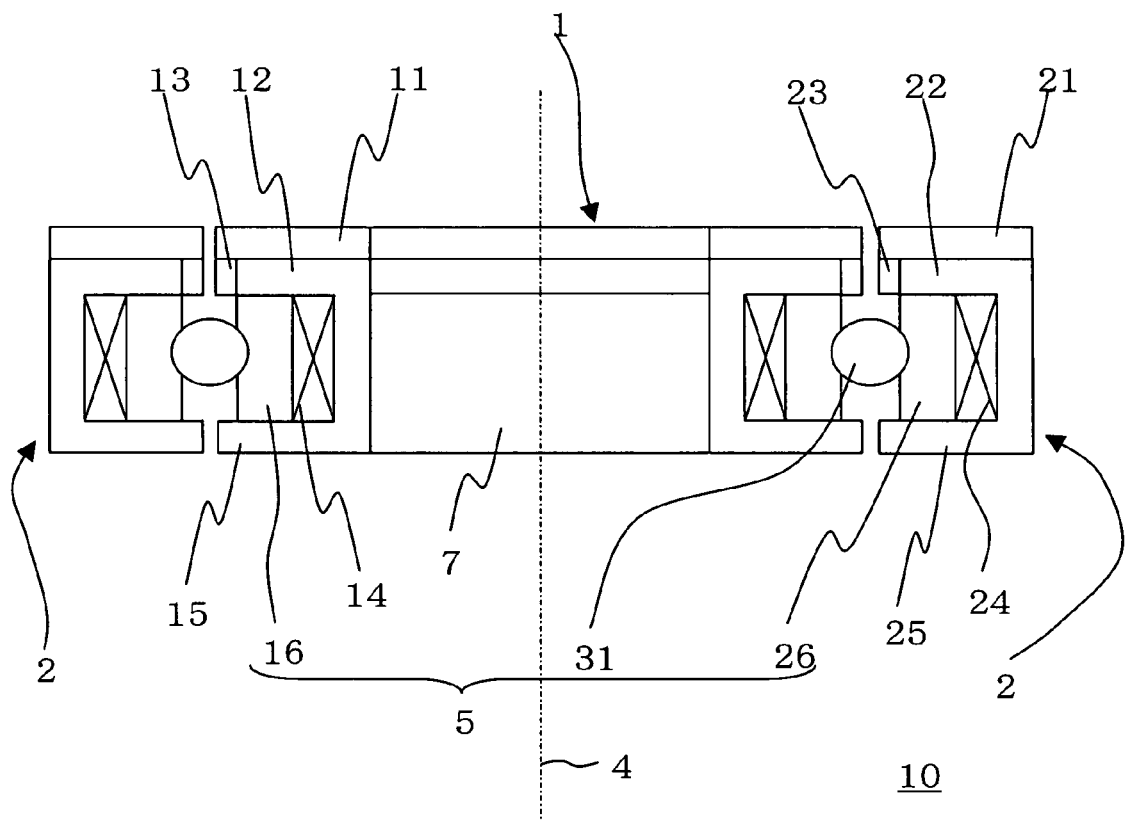
FIG. 8 illustrates another example of the contactless connector 10 to which the present invention is applied.

In the example in FIG. 8, the rotation-side light elements 13 are located on the outer circumference of the rotation-side holding portion 12, and the fixed-side light elements 23 are arranged opposite the rotation-side light elements 13 as per FIG. 2. In this example, unlike FIG. 2, the rotation-side light elements 13 and fixed-side light elements 23 is constituted in one stage. The length of the cylinder of the rotating body 1 can be shortened in comparison with the length in FIG. 2, and it is therefore possible to implement communication continuity and miniaturization of the contactless connector 10.

Figure 9:
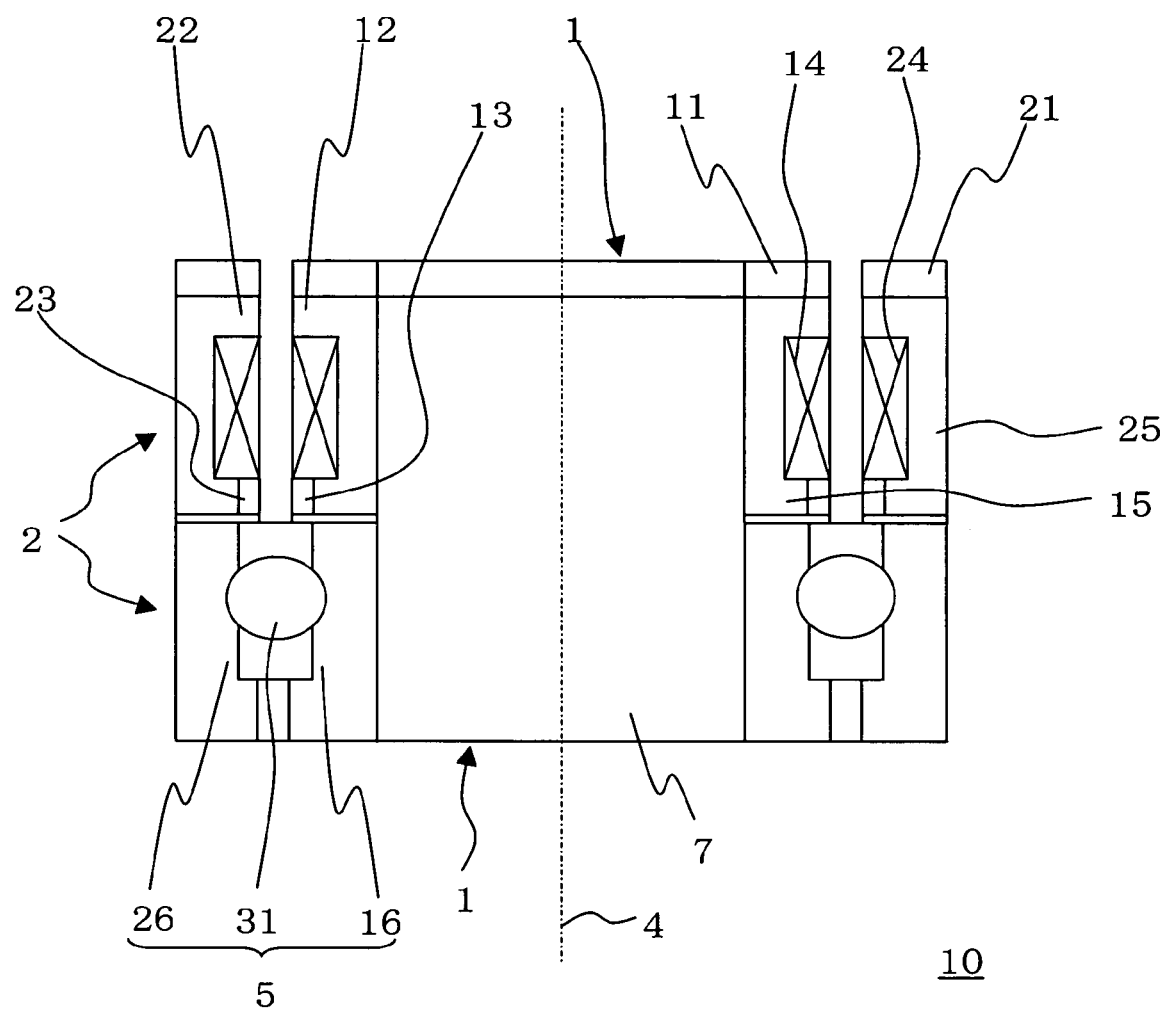
FIG. 9 illustrates another example of the contactless connector 10 to which the present invention is applied.

FIG. 9 is an example in which the bearing 5 is disposed in a position spaced apart from the rotation-side transformer core 15 and fixed-side transformer core 25, and in which the bearing 5 and light communication parts such as the light elements 13, 23 are made of different member. The rotation-side light element 13 and fixed-side light element 23 are arranged between the bearing 5 and rotation-side transformer core 15, or the bearing 5 and fixed-side transformer core 25.

In this example, the bearing 5 is disposed in a position spaced apart from the magnetic circuit that is formed from the transformer cores 15, 25 and transformer windings 14, 24. Therefore, there is no need to make the member of the bearing 5 a nonmagnetic material, and the bearing 5 can be constituted from a variety of materials such as magnetic materials.

Further, the rotation-side light elements 13 and fixed-side light elements 23 need not be arranged below the rotation-side transformer winding 14 and fixed-side transformer winding 24 respectively as shown in FIG. 9, and may be arranged above the windings 14, 24, for example. So too in this case, it is understood that the two light elements 13, 23 are able to secure communication continuity because the light path shown in FIG. 3 is formed.

Figure 10:
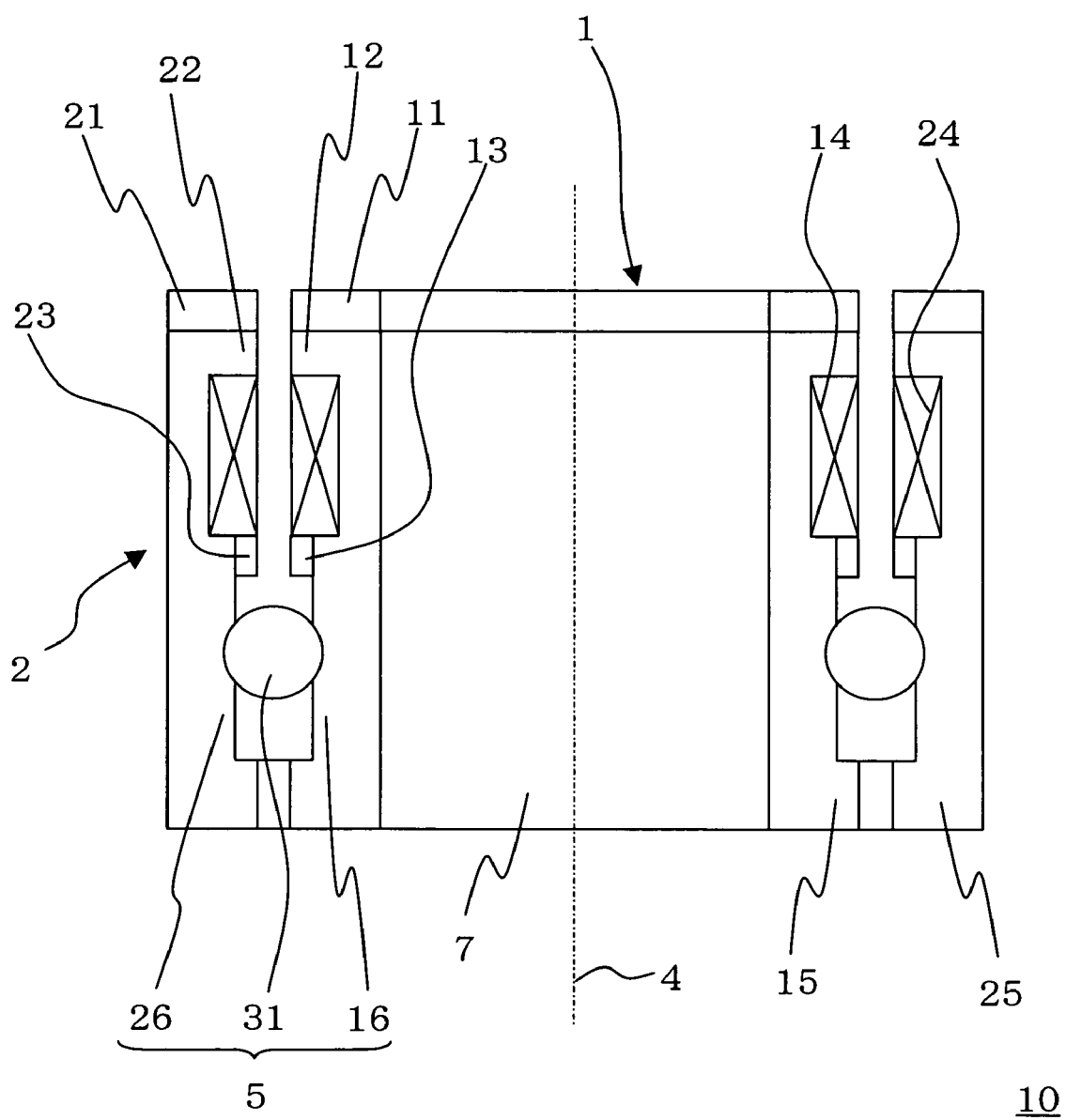
FIG. 10 illustrates another example of the contactless connector 10 to which the present invention is applied.

FIG. 10 is an example in which the bearing 5 and optical communication parts are the same member. That is, this is an example in which the inner ring 16 is part of the rotation-side transformer core 15, and the outer ring 26 is part of the fixed-side transformer core 25. In comparison with FIG. 9 and so forth, in this example, the length of the transformer cores 15, 25 are long along the rotational axis 4. In this case also, the rotation-side light elements 13 may be provided above rather than below the rotation-side transformer winding 14, and the fixed-side light elements 23 may also be provided above the fixed-side transformer winding 24.

Figure 11:
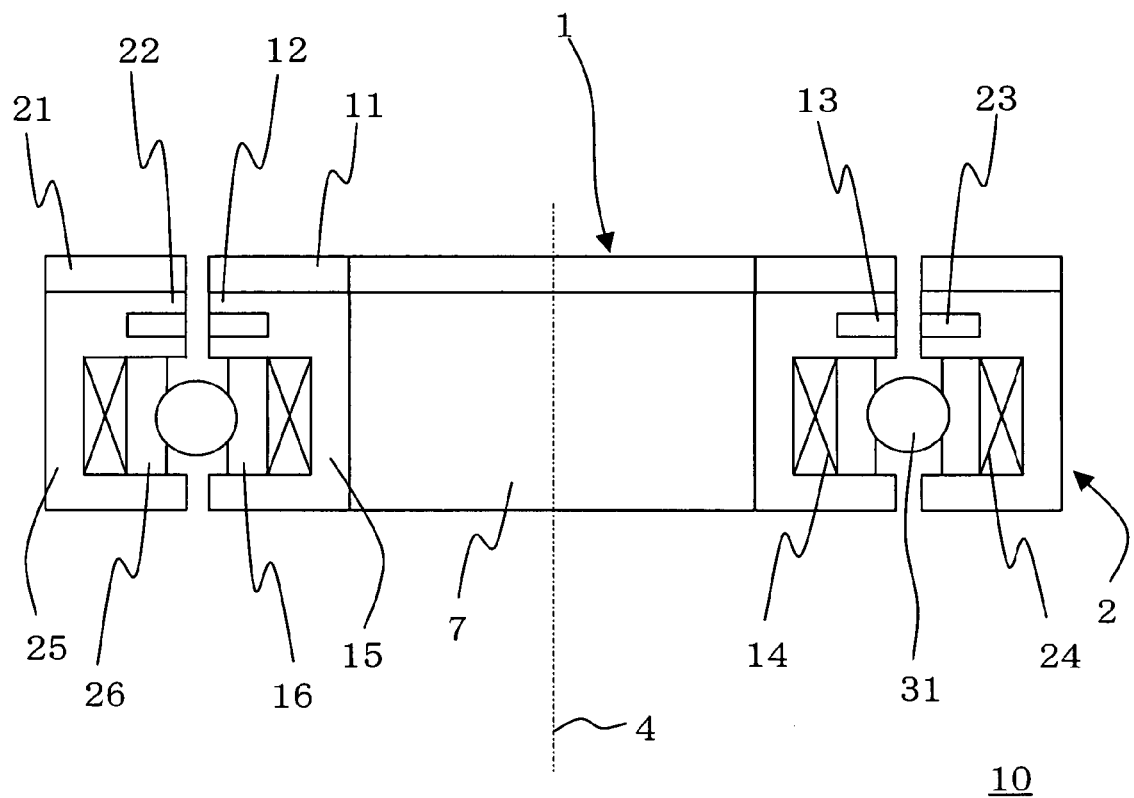
FIG. 11 illustrates another example of the contactless connector 10 to which the present invention is applied.

FIG. 11 is an example in which grooves are provided in the outside wall of the rotation-side holding portion 12 and the inside wall of the fixed-side holding portion 22, and the rotation-side light elements 13 and fixed-side light elements 23 are arranged in the respective grooves. That is, grooves are provided in the direction of the rotational axis 4 in the outside wall of the rotation-side holding portion 12. Grooves are also provided in the direction opposite the direction of the rotational axis 4 in the inside wall of the fixed-side holding portion 22. Further, rotation-side light elements 13 and fixed-side light elements 23 are arranged in these grooves. Although the light path formed by the two light elements 13, 23 is also formed in the grooves, the light path is the same as FIG. 3 and so forth. The communication continuity is accordingly secured.

In this case, in comparison with the example of FIG. 3 and so forth in which the light elements 13, 23 are provided between the rotating body 1 and fixed body 2, the light elements 13 and 23 are arranged in the inner of the rotating body 1 and fixed body 2. Therefore, there is no obstacle to the rotation operation of the rotating body 1. Further, because a space to provide the light elements 13, 23 between the rotating body 1 and fixed body 2 is required, miniaturization of the contactless connector 10 can be implemented to the same degree. Grooves are provided in the holding portions 12, 22 above the bearing 5 in FIG. 11 but grooves may be provided in the transformer cores 15, 25 below the bearing 5.

Further, the positions of the grooves are not strictly the rotation-side holding portion 12 and fixed-side holding portion 22. For example, the groove can also be provided in the inner ring 16 and outer ring 26 of the bearing 5. Originally, the space efficiency increases as a result of providing light elements 13, 23 on the inner ring 16 and outer ring 26 that are provided in order to hold the rolling element 31 and so forth and, in this case also, miniaturization of the contactless connector 10 can be implemented. In addition, the light elements 13, 23 can be arranged extending over a plurality of stages by also providing groove in the rotation-side holding portion 12 and fixed-side holding portion 22, whereby multiple channels can be implemented.

Figure 12:
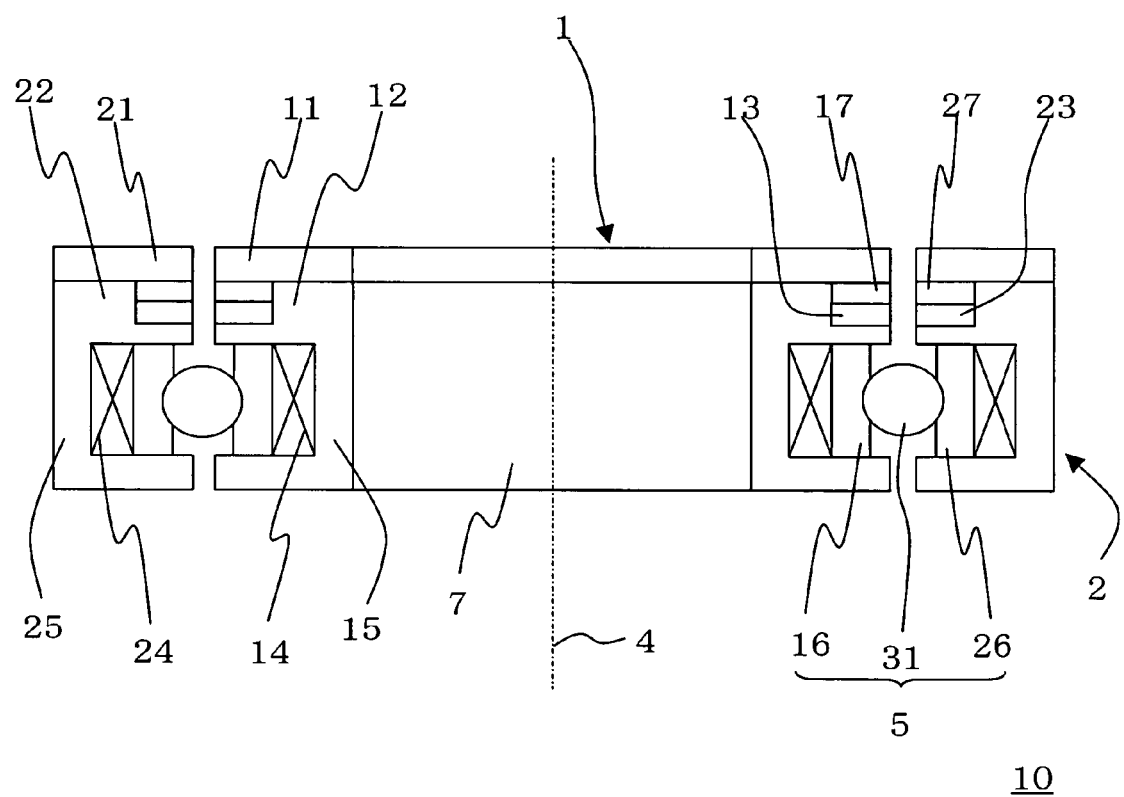
FIG. 12 illustrates another example of the contactless connector 10 to which the present invention is applied.

The example of FIG. 12 is an example in which the light elements 13, 23 are not provided in groove. Instead, cutouts 17, 27 are provided above the light elements 13, 23, and the light elements 13, 23 are provided in the cutouts 17, 27. That is, cutout 17 is provided in the direction of the bearing 5 above the rotation-side holding portion 12 and below the rotation-side electric circuit portion 11, and the rotation-side light element 13 is disposed in the cutout 17. Further, cutout 27 is provided in the direction of the bearing 5 above the fixed-side holding portion 22 and below the fixed-side electric circuit portion 21, and the fixed-side light element 23 is disposed in the cutout 27. The rotation-side light element 13 and fixed-side light element 23 are arranged mutually opposite one another in the circumferential direction in which the rotating body 1 rotates so that the light path between the rotation-side light element 13 and fixed-side light element 23 is not obstructed.

Therefore, in this case also, an unbroken light path is formed as per FIG. 3 and so forth, and communication continuity is secured. Further, the efficiency of space can be raised as per the example in which grooves are provided, and miniaturization of the contactless connector 10 can be implemented. In the example of FIG. 12, the cutouts 17, 27 are provided in the holding portions 12, 22 but light elements 13, 23 may be arranged mutually opposite one another by providing the cutouts 17, 27 below the transformer windings 14, 24, for example.

Figure 13:
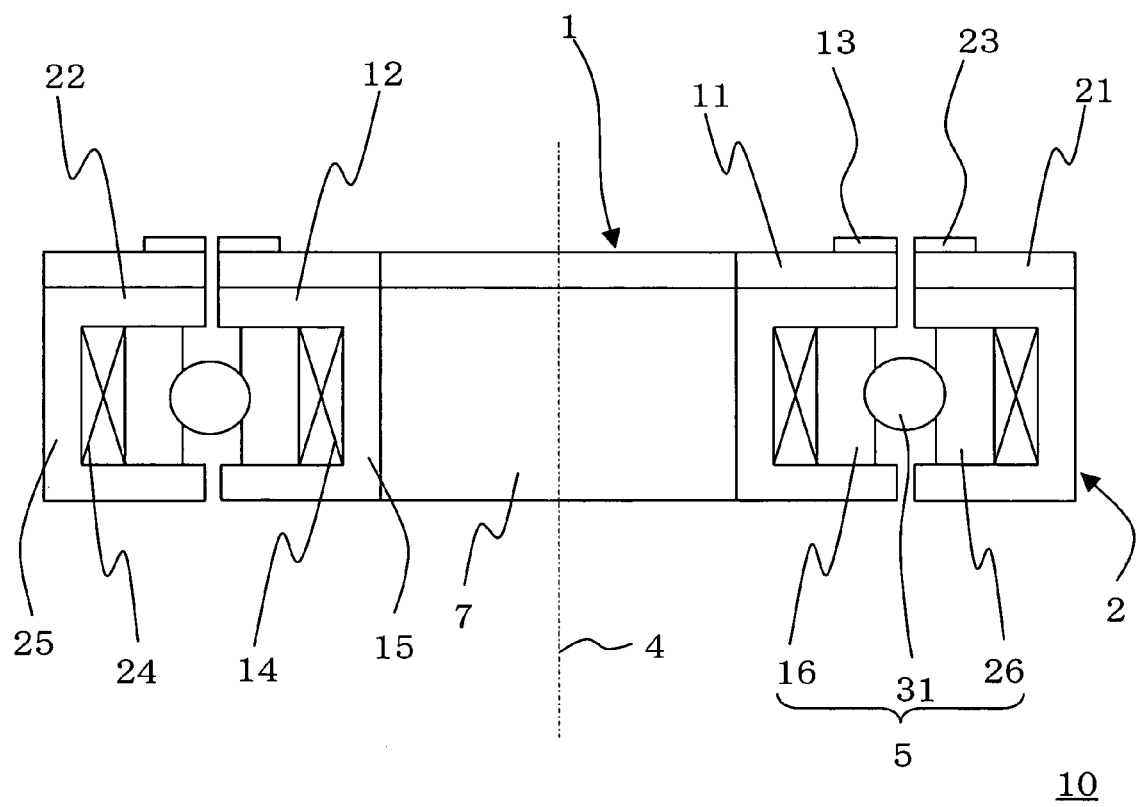
FIG. 13 illustrates another example of the contactless connector 10 to which the present invention is applied.

The example in FIG. 13 is an example in which the light elements 13, 23 are arranged above the rotating body 1 and fixed body 2. That is, this is an example in which the light elements 13, 23 are arranged above the circular plates of the rotating body 1 and fixed body 2 along the outside wall of the rotating body 1 and the inside wall of the fixed body 2. In this case also, the same light path as in FIG. 3 and so forth is formed between the rotation-side light element 13 and fixed-side light element 23, which results in an unbroken light path, whereby communication continuity is secured.

Further, because, in this example also, the light elements 13, 23 are arranged on the inside of the rotating body 1 and fixed body 2, the rotating action of the rotating body 1 is not obstructed, and the contactless connector 10 can be made small. So too in this case, similar effects are produced even when the light elements 13, 23 are provided below rather than above the rotating body 1 and fixed body 2 as shown in FIG. 13.

Figure 14:
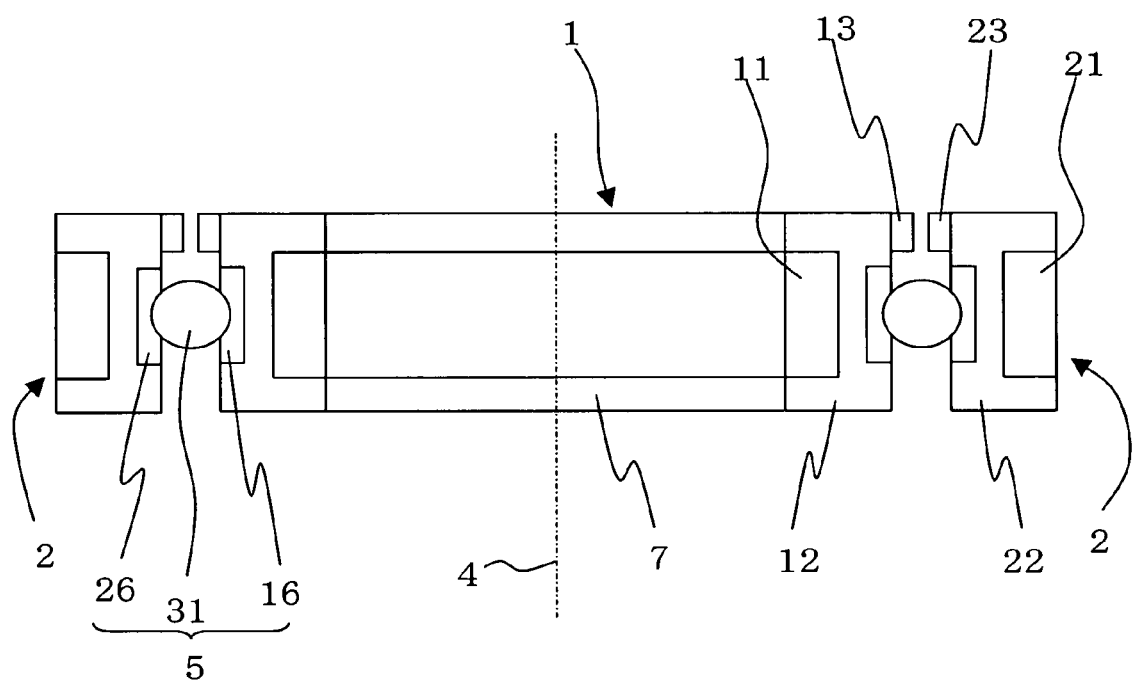
FIG. 14 illustrates another example of the contactless connector 10 to which the present invention is applied.

FIG. 14 is an example in which the magnetic circuit for constituting the rotating transformer has been removed. That is, this is an example in which the transformer winding 14, 24 and transformer cores 15, 25 have been removed from the rotating body 1 and fixed body 2 respectively. The supply of power to the rotating body 1 may be such that the rotating body 1 comprises a storage battery or dry cell, for example, and the rotation-side electric circuit portion 11 or the like is driven by the power of the storage battery or dry cell in the rotating body 1. In addition, power from the main body apparatus may also be supplied in the two directions of the rotating body 1 and fixed body 2.

In this example, because there is no need to consider a magnetic circuit, there is also no need to make the bearing 5 a nonmagnetic material. The bearing 5 can be constituted from a variety of materials. Further, the rotation-side electric circuit portion 11 is disposed on the inner periphery of the rotation-side holding portion 12, and the fixed-side electric circuit portion 21 is disposed on the outer periphery of the fixed-side holding portion 22. Originally, the transformer winding 14, 24 are arranged in the positions of the rotation-side electric circuit portion 11 and fixed-side electric circuit portion 21. However, the freedom of the positions for arranging the electric circuit portions 11, 21 increases when the windings 14, 24 are absent. Therefore, miniaturization of the contactless connector 10 can be implemented. Naturally, the electrical circuit portions 11, 12 may be arranged above or below the holding portions 12, 22.

The rotation-side light elements 13 in this example are arranged above the rotation-side holding portion 12 and on the outside wall of the rotating body 1, and the fixed-side light elements 23 are arranged above the fixed-side holding portion 22 and on the inside wall of the fixed body 2. As long as the arrangement of the two light elements 13, 23 is one in which the rotating transformer is removed, the arrangement need not strictly be that of the example in FIG. 14. For example, groove may be provided and the light elements 13, 23 may be arranged in the groove (FIG. 11) or cases where cutouts 17, 27 are provided (FIG. 12) and where the light elements 13, 23 are arranged above the circular plates (FIG. 13) are acceptable. In all cases, communication continuity can be secured and bidirectional multiple channels and miniaturization can be implemented.

Figure 15:
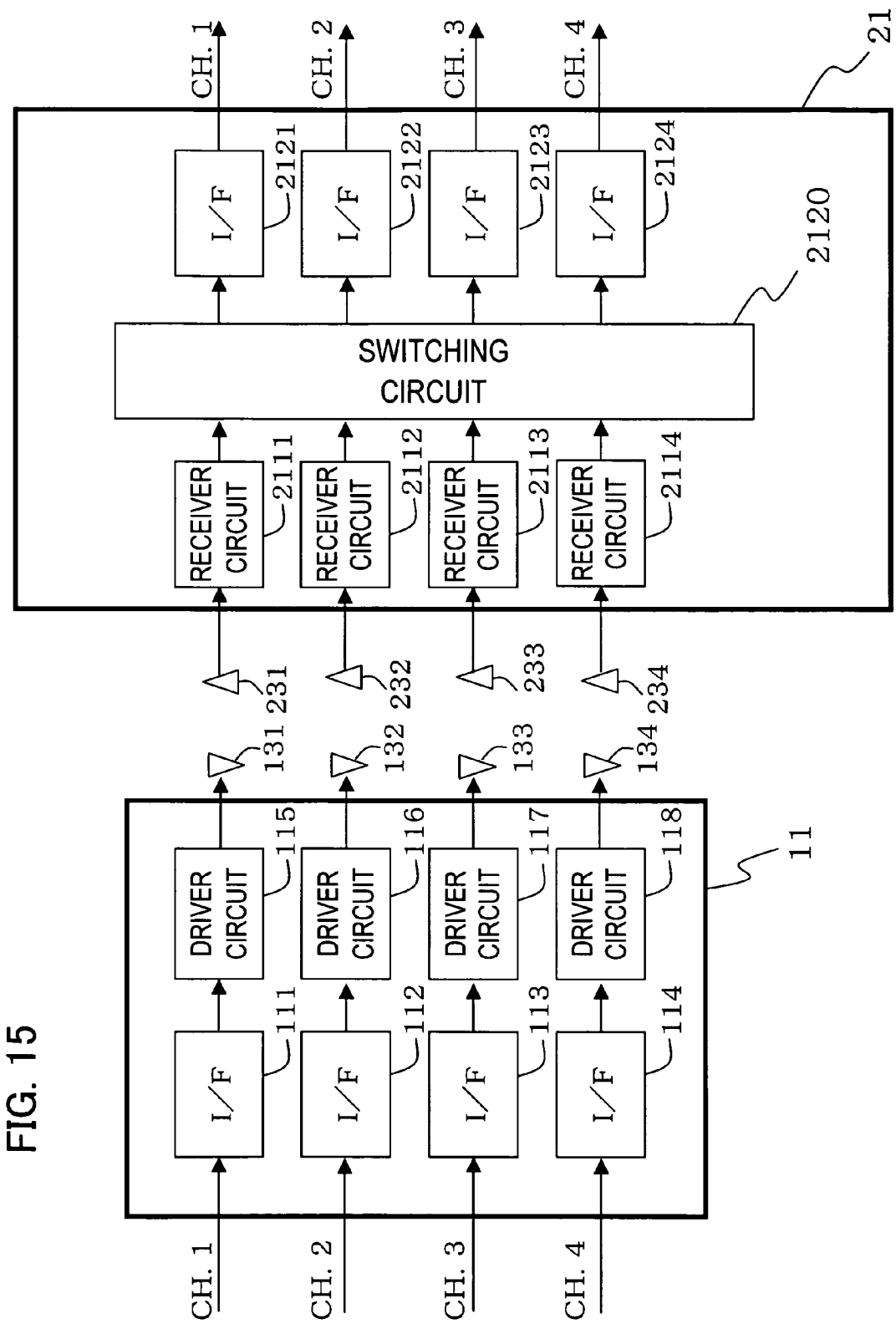
FIG. 15 illustrates the constitution of a rotation-side electric circuit portion 11 and fixed-side electric circuit portion 21.

The constitution and action of the rotation-side electric circuit portion 11 and fixed-side electric circuit portion 21 will be described next. FIG. 15 shows the constitution. FIG. 15 shows an example of a case where data of four channels is sent and received (CH.1 to CH.4 respectively). Further, the electric circuit portions 11, 21 shown in FIG. 15 also apply to any contactless connector 10 shown in FIGS. 1 to 14.

The rotation-side electric circuit portion 11 is constituted by four interfaces (I/F) circuits 111 to 114 and four driver circuits 115 to 118, as shown in FIG. 15.

Each of the I/F circuits 111 to 114 is inputted data (CH. 1 to CH. 4) which is supplied by the main body apparatus connected to the rotating body, and converts to data that can be processed in the electric circuit portion 11. In the example of FIG. 15, the data of the four channels is sent and received and, therefore, the respective I/F circuits 111 to 114 (four in total) are provided for each channel.

The driver circuits 115 to 118 are circuits that produce drive data for driving the rotation-side light elements 13. The driver circuits 115 to 118 are inputted data from the I/F circuits 111 to 114, and produces the drive data corresponding with the data. The driver circuits 115 to 118 exist in a quantity corresponding with the number of inputted channels (four in total in this embodiment). The generated drive data is supplied to each of the rotation-side light elements 131 to 134.

Thereafter, the rotation-side light elements 131 to 134 emit light corresponding with the drive data by means of photoelectric conversion or the like on the basis of drive data supplied by each of the driver circuits 115 to 118. In the case of this example, the rotation-side light elements 131 to 134 are light-emitting elements, and are constituted by a number of elements corresponding with the number of input channels (four in this embodiment).

The fixed-side light elements 231 to 234 are constituted from the same number or more than the rotation-side light elements 131 to 134 to be able to receive light continuously without the light from the rotation-side light elements 131 to 134 being broken when the rotating body 1 is rotating as mentioned above. The case of FIG. 15 is constituted by four fixed-side light elements 231 to 234. The light from the rotation-side light elements 131 to 134 is received by forming pairs with the fixed-side light elements 231 to 234. Further, in the case of this example, the fixed-side light elements 231 to 234 function as light-receiving elements.

The fixed-side electric circuit portion 21 is constituted by receiver circuits 2111 to 2114 that are each connected to respective fixed-side light elements 231 to 234, a switching circuit 2120, an interface (I/F) circuit 2121 to 2124.

The receiver circuits 2111 to 2114 are also connected to the switching circuit 2120, and received light signals from the fixed-side light elements 231 to 234 are each inputted to the receiver circuits 2111 to 2114. The receiver circuits 2111 to 2114 convert the received light signals into data that can be processed in the fixed-side electric circuit portion 21, and outputs the converted data to the switching circuit 2120. In the case of this example, because there are four light elements 231 to 234, there are also four of the receiver circuits 2111 to 2114 corresponding with the elements.

The switching circuit 2120 is inputted data from the respective receiver circuits 2111 to 2114, and serves to switch the input data in order to supply same to the output ports of the channels requiring the each data. That is, this switching circuit 2120 serves to implement a free connection relationship between the input channel and output channel of the contactless connector 10, and is actually constituted by a plurality of logic circuits. Because, in the case of this example, a contactless connector 10 that performs transmission and reception on four channels is employed, four output ports are provided in correspondence.

The I/F circuits 2121 to 2124 is inputted data that is supplied from the switching circuit 2120, and convert this data into data that can be outputted to the outside. Because the case of this example comprises four output ports, four I/F circuits 2121 to 2124 exist. Further, the data that is outputted from the respective I/F circuits 2121 to 2124 is outputted to the output ports corresponding with each of the required channels. In FIG. 15, the output data of CH. 1, CH. 2, CH. 3 and CH. 4 are outputted in order starting from the top.

An example of an operation including each of the electric circuit portions 11 and 21 constituted thus will be described by using FIG. 16.

First, when the power to the main body apparatus connected to the fixed body 2 is turned on, the power is supplied to the fixed-side electric circuit portion 21 with suitable timing. Further, the rotating body 1 is drive-rotated by the drive of the main body apparatus connected to the rotating body 1. For example, if the main body apparatus is a turntable capable of 360° rotation, the camera itself which is on the turntable rotates, and the rotating body 1 connected to the turntable also rotates. In addition, the power is also supplied to the fixed-side transformer winding 24. As a result of current being supplied to the winding 24, a magnetic field is produced and the power is supplied to the rotation-side transformer winding 14 of the rotating body 1 as detailed earlier. As a result, the rotation-side light elements 13 can be driven. Further, when video data and so forth is supplied from the camera on the main body apparatus to the rotating body 1, video data and so forth is inputted to the rotation-side electric circuit portion 11 as shown in FIG. 15. An example of the data is shown in FIG. 16.

Figure 16:
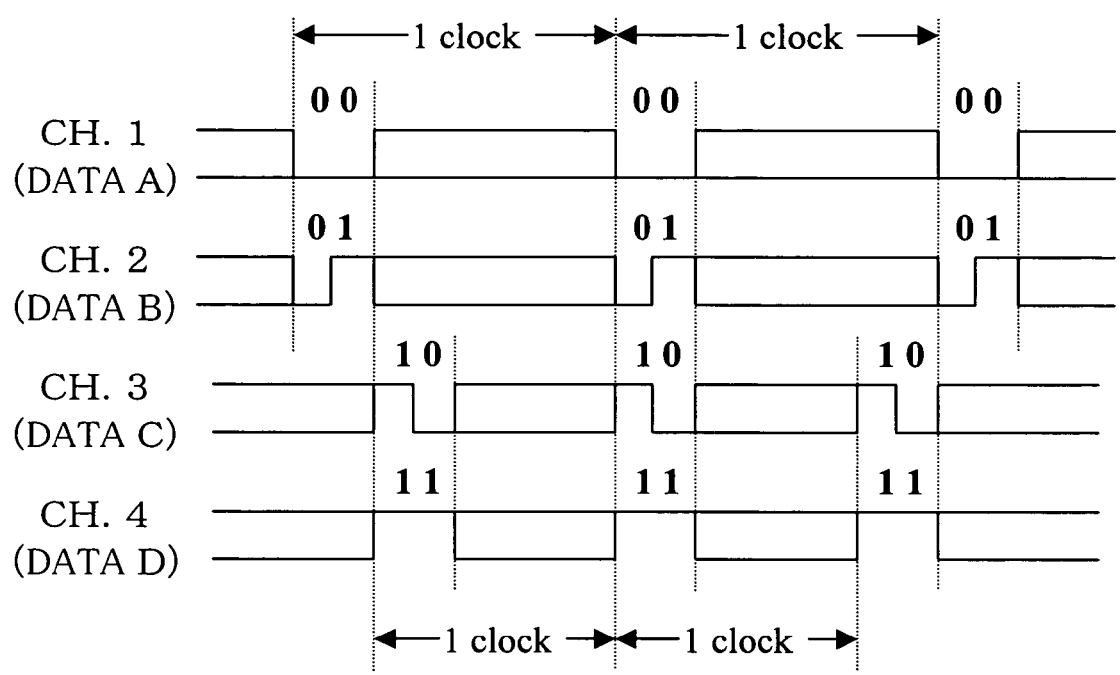
FIG. 16 illustrates an example of data that is processed by the electric circuit portions 11 and 21.

The example of FIG. 16 is an example in which data that is different for channel 1 (CH. 1) and channel 3 (CH. 3) (video and audio data respectively, for example) is inputted. Further, clock data for synchronizing the data of channel 1 and channel 3 is inputted in channel 2 (CH. 2) and channel 4 (CH. 4) respectively. Thus data that is different for each channel is generated and inputted to the contactless connector 10. Further, the generation of such data and the separation of data for each channel is performed by a processing circuit of the main body apparatus.

The data of each channel can be identified by encoding the data shown in FIG. 16. That is, by causing light to be emitted by the light elements 131 to 134 by inserting data for channel identification in the data header of each channel, the switching circuit 2120 of the fixed body 2 is able to identify the data of the inputted channel. Therefore, the switching circuit 2120 is able to switch the inputted data of any one of channels so that the data is outputted to the desired output stage.

That is, as shown in FIG. 16, the light emitted from the light elements 131 to 134 is received by light-receiving elements 231 to 234 by adding a 2-bit identification code to the header of the respective data of each channel. Further, the data that is inputted to the switching circuit 2120 via the receiver circuits 2111 to 2114 makes it possible to identify which channel the data received by means of the identification codes belongs to, whereby an input and output relationship corresponding with the pre-integrated logic is obtained.

For example, as shown in FIG. 16, the data is first channel data when the identification code is "00", second channel data when the identification code is "01", third channel data when the identification code is "10", and fourth channel data when the identification code is "11" and if the identification codes are added to the data header, the switching circuit 2120 switches input data to output the output to the I/F 2121 as first channel data when the identification code is "00". Similarly, the second channel is outputted to the I/F 2122, the third channel is outputted to the I/F 2123, and the fourth channel is outputted to the I/F 2124. Further, the identification codes of this example are added to the header of one clock's worth of data as shown in FIG. 16.

Further, such channel identification encoding may be performed by a data processing circuit of the main body apparatus connected to the fixed body 2, or may be performed by driver circuits 115 to 118 of the rotation-side electric circuit portion 11. Further, rather than adding channel identification code to all data of all channel, the code may be added to only any one of the plurality of the channel, to perform identification of individual channel (dedicated line implementation). Moreover, the addition of identification codes may be performed for an every predetermined number of clocks rather than for each clock as shown in FIG. 16, and may be added to each frame header of video data, for example.

Thus, by adding identification code to data, if the fixed body 2 receives the data of multiple channels, the fixed body identifies each channel and outputs the data to predetermined output port, so that an automatic channel switching function can be realized in the contactless connector 10.

Although, in the above example, a description is provided for an example in which the rotation-side light elements 13 are light-emitting elements and the fixed-side light elements 23 are light-receiving elements, apart from this the rotation-side light elements 13 may be light-receiving elements and the fixed-side light elements 23 may be light-emitting elements. In this case, the electric circuit portion 11 of the rotating body 1 comprises the receiving circuits, the switching circuit, and I/F circuits, and the electric circuit portion 21 of the fixed body 2 comprises the I/F circuits and the driving circuits. Further, bidirectional contactless data transmission and reception can be performed by the rotating body 1 and fixed body 2 by providing both light-emitting elements and light-receiving elements in the rotation-side light elements 13 and fixed-side light elements 23. In this case, the rotation-side electric circuit portion 11 and fixed-side electric circuit portion 21 both comprise the I/F circuits, the driver circuits, the receiver circuits, and switching circuit or the like.

What is claimed is:

1. A contactless connector including a rotation-side light element provided on a rotating body that rotates about a rotational axis, and a fixed-side light element provided on a fixed body in a position facing the rotation-side light element, and performing contactless data transmission and reception between the rotation-side light element and the fixed-side light element, wherein
   the rotating body is formed in a cylindrical shape with the rotational axis as the center axis of the rotating body;
   the rotation-side light element is on the cylindrical face of the rotating body and is provided to emit light in the circumferential direction in which the rotating body rotates; and
   the fixed-side light element is provided on the fixed body so as to be able to receive the light that is emitted from the rotation-side light element; and
   the rotation-side light element and the fixed-side light element are provided in a region between the rotating body and the fixed body and in a plurality of concentric circles in which the rotating body rotates, and extend over a plurality of stages.

2. The contactless connector according to claim 1, wherein the rotation-side light element is provided extending over a plurality of stages on the cylindrical face of the rotating body, and the fixed-side light element is provided extending over a plurality of stages on the fixed body.

3. The contactless connector according to claim 1, wherein rotation-side light-receiving elements and rotation-side light-emitting elements are provided in combination on the cylindrical face of the rotating body, and fixed-side light-emitting elements and fixed-side light-receiving elements are each provided in combination in position which an unbroken light path to the rotation-side light-receiving elements and the rotation-side light-emitting elements is formed respectively with the rotation of the rotating body.

4. The contactless connector according to claim 1, wherein rotation-side light-emitting elements or rotation-side light-receiving elements are provided in any stage of the rotating body;
   fixed-side light-receiving elements or fixed-side light-emitting elements are each provided in positions which an unbroken light path to the rotation-side light-emitting elements or the rotation-side light-receiving elements is formed respectively with the rotation of the rotating body;
   rotation-side light-receiving elements or rotation-side light-emitting elements are provided in a different stage from the any stage; and fixed-side light-emitting elements or fixed-side light-receiving elements are each provided in positions which un-broken light path to the rotation-side light-receiving elements or the rotation-side light-emitting elements is formed respectively with the rotating of the rotating body.

5. The contactless connector according to claim 1, further comprising:

a switching unit, to which data output from a rotation-side light-receiving element or a fixed-side light-receiving element is input, and which are for identifying which light-emitting element input data is from, and for switching the identified input data to an output that is requested beforehand.

6. The contactless connector according to claim 1, further comprising:

a rotating transformer that is comprised by a transformer core and a transformer winding on the rotating body and the fixed body respectively.

7. The contactless connector according to claim 1, wherein the rotating body and the fixed body both further comprise a groove or a cutout, and the rotation-side light element and the fixed-side light element are provided in the groove or the cutout.

8. The contactless connector according to claim 1, wherein the fixed body further comprises a mirror for reflecting light emitted from the rotation-side light element or the fixed-side light element.

* * * * *

UNITED STATES PATENT AND TRADEMARK OFFICE
CERTIFICATE OF CORRECTION

PATENT NO. : 7,539,372 B2
APPLICATION NO. : 11/234333
DATED : May 26, 2009
INVENTOR(S) : Koitabashi It is certified that error appears in the above-identified patent and that said Letters Patent is hereby corrected as shown below:

On the Title Page:

Column 2 - (57) ABSTRACT:

Please insert --A-- at the beginning of the Abstract of the Disclosure paragraph.

Signed and Sealed this

Twenty-fifth Day of August, 2009

David J. Kappos
*Director of the United States Patent and Trademark Office*